Figure 1:
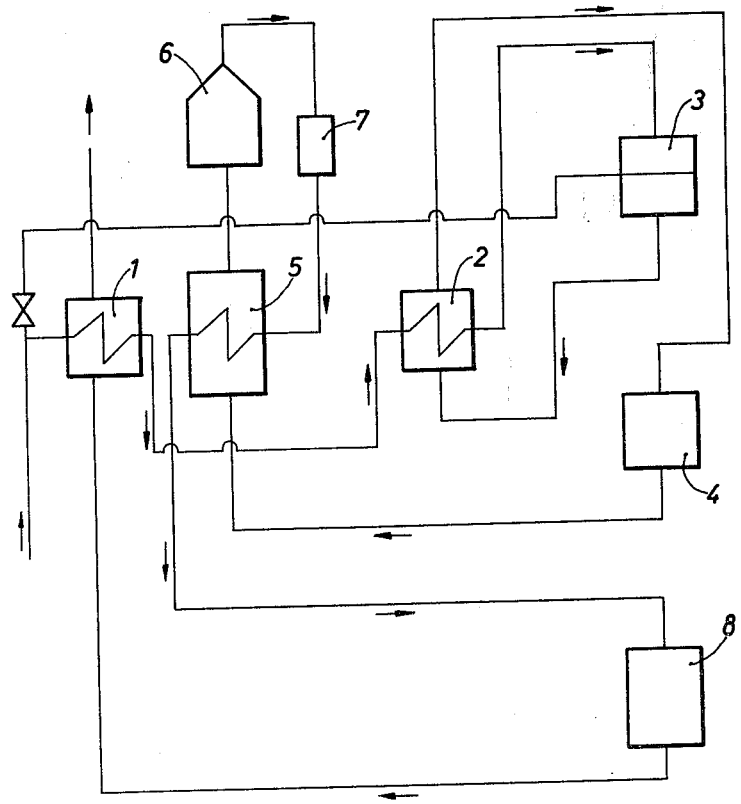

July 28, 1964 H. GUTH ETAL 3,142,536
PROCESS FOR THE PRODUCTION OF SULPHUR TRIOXIDE
Filed Sept. 13, 1961 2 Sheets-Sheet 1

INVENTORS:
HANS GUTH, ALOYS HEITMANN, WILHELM MÖLLER, HELLMUTH WERTH
ATTORNEYS 3,142,536
**PROCESS FOR THE PRODUCTION OF
SULPHUR TRIOXIDE**
Hans Guth, Bergisch Neukirchen, Aloys Heitmann and
  Wilhelm Möller, Leverkusen, and Helmuth Werth,
  Blecher-Bohn, Bergisch Gladbach, Germany, assignors
  to Farbenfabriken Bayer Aktiengesellschaft, Leverkusen, Germany, a corporation of Germany
Filed Sept. 13, 1961, Ser. No. 137,779
Claims priority, application Germany Sept. 17, 1960
9 Claims. (Cl. 23—175)

When roasting iron pyrites with air, roasting gases containing about 8% of $SO_2$ are formed by the hitherto usual roasting processes. Since it is understandably desirable to achieve a best possible conversion for catalytic oxidation of sulphur dioxide on for example vanadium catalysts and, on the basis of the law of mass action, this is achieved when as much oxygen as possible is present, the roasting gases are diluted with air to for example 6% of $SO_2$ before entering the catalytic furnace.

In this way, using known multi-stage catalytic furnaces, conversions of up to about 98% are obtained. In most cases, the quantities of $SO_2$ which are unreacted are discharged into the atmosphere. Due to the development of roasting processes for pyrites in recent years, (together with the recovery of vapours), in fluidized bed furnaces, shelved furnaces or rotary furnaces, substantially more concentrated roasting gases (12 to 15% $SO_2$) are now obtained with roasting than was formerly possible. These roasting gases are of course also diluted with air before entering the catalytic furnace, for the reasons indicated above.

In order to achieve better conversions, which are more important on account of the known requirements as regards purity of the atmosphere, it has also already been proposed to design a multi-stage catalytic furnace in such a way that the $SO_3$ which is formed is not only absorbed after passing through all the catalyst stages, but an absorption of the $SO_2$ partially reacted to $SO_3$ is also carried out between the individual catalyst stages, and according to the literature, conversions up to 99% can be produced in this way. Based on these considerations, roasting gases of conventional concentration (i.e., those with about 6 to 7% and at the most 9% of $SO_2$) have also been used initially. As can be appreciated from the literature, when using this process which operates with intermediate absorption, the equipment is so costly and complicated that the process has never been used for practical purposes.

As is known, the cold roasting gases entering a catalyst system are brought to the reaction temperature in heat exchangers by means of the hot catalyst gases. Since the incorporation of intermediate absorbers in the catalyst flow causes the loss of some of the roasting gas heat for the initial heating of the cold gases, many people have formed the opinion that an external supply of heat would be necessary when using intermediate absorption. Since the view was held that in the case of contact with intermediate absorption, the heat of reaction of the gases coming from the intermediate absorption is not sufficient, on account of the low $SO_2$ content, to maintain the reaction temperature in the following catalyst stage, it has also already been proposed to employ the heat of reaction of the preceding catalyst stage for heating the following contact space.

Such a process is complicated and also leads to the fact that due to the heating of the final catalyst with the roasting gases of the previous stage, the temperature thereof rises, whereas it is desired that the temperature should be kept as low as possible. It is known that the conversion of $SO_2$ to $SO_3$ is at its maximum when the temperature of the final contact is as low as possible. The desired object of obtaining maximum conversions is thus directly counteracted by heating the final catalyst.

The subject of the present invention is a process for the production of sulphur trioxide from pyrite roasting gases containing sulphur dioxide by the catalyst or contact process in several stages with intermediate absorption of the sulphur trioxide, in which purified, cooled pyrite roasting gases with a sulphur dioxide content of 9 to 12% and advantageously about 10% of $SO_2$ are initially used; the catalysis takes place in three stages and a single intermediate absorption of the sulphur trioxide takes place before the last catalysis stage, the catalytic process being carried out without any external supply of heat and the last catalyst stage not being heated with the roasting gases of the penultimate stage. Using the process according to the invention, conversions of 99.5% and higher are produced.

In order to produce this high conversion, neither a dilution of the roasting gases to 6% $SO_2$ nor external heating are necessary. It is also not necessary for the final catalyst to be heated with the roasting gases of the preceding stage in order to maintain the reaction temperature.

By using gases having such a high $SO_2$ concenration and using catalysis in three stages with an intermediate absorption before the last catalysis stage, a number of technical advantages are produced, by which the process which is uneconomical when using low-percentage roasting gases (6% $SO_2$) is transformed into an economically advantageous process.

For example, when using a three-stage catalytic furnace with intermediate absorption with cooled sulphuric acid in trickling towers, the heat exchange surface which would amount to 40 square metres per ton of $SO_3$ per day when using 6% roasting gases is reduced to 18 square metres per ton of $SO_3$ per day when using gases containing 10% of $SO_2$, without any supplementary heating being necessary. The technical advantage of using gases with a higher percentage of $SO_2$ and the possibility thereby provided of making the heat exchange surface smaller is obvious. However, the use of for example 10% roasting gases produces even more technical advantages. Based on the same productive output, the gas volumes to be conveyed are reduced to 60% when using 10% roasting gases instead of 6% roasting gases, that is to say, the necessary cross-sectional area is also reduced to 60% with the same gas velocities in the driers and absorbers. Thus, in spite of the necessary intermediate absorber, this cross-sectional area is not larger than when the catalysis is carried out with 6% roasting gases without the use of intermediate absorbers.

In conjunction with the gases having a higher percentage of $SO_2$, it is also possible for the pipelines, fans etc. to be of smaller dimensions.

A catalysis in more than three stages would only cause unnecessarily higher expenditure and the conversion which can be achieved would scarcely be improved.

A process has also already been proposed which likewise subjects pyrite roasting gases containing 10–12% of $SO_2$ to a catalysis with intermediate absorption and which likewise achieves very high conversions. In contrast to the present invention, the process starts however with pyrite roasting gases at a temperature of 400° C., and the inventor of the process has apparently presumed that with cold roasting gases, as already described above, an expensive supplementary external heating would be necessary, and it is his intention to avoid this by using the hot gases. Hot roasting gases at a temperature of 400° C. are however definitely contaminated. They always contain dust, and above all arsenic and $SO_3$. It is only by cooling the pyrite roasting gases to 60–70° C. and subsequently performing a settlement (for example in coke boxes or E.G.R.

chambers) that the gases can be freed from these impurities.

In spite of interposing dust collectors after the separate catalyst stages in this known process, which dust collectors are very ineffective in this form, it is to be expected that the catalysts very quickly become affected with dust and then a further gas passage becomes impossible. Arsenic is a serious contact poison, which cancels out the catalytic efficiency after a very short time, especially with platinum catalysts, which are mentioned as examples in the process referred to. Furthermore, in the presence of arsenic, a sulphuric acid containing arsenic is obtained, and this can only be used to a limited extent.

The process referred to can only be used in practice for pyrite roasting gases if they are purified beforehand, i.e., cooled to 60–70° C. and then, after filtration, are heated externally to 400° C. and higher. Such a complicated and costly external heating is however obviated in an advantageous manner by the process according to the present invention.

The operation of the process is reproduced diagrammatically in the accompanying drawing, FIG. 1. The 10% roasting gases arriving from the roasting furnace pass, for the major part, through heat exchangers 1 and 2 and are heated therein with indirect heat exchange by means of hot catalyst gases to the starting temperature and then pass into a first catalyst stage 3. Due to the high $SO_2$ concentration, the temperature rise with the oxidation to $SO_3$ is so strong that the vanadium catalyst composition could suffer damage. In order to avoid this, cold roasting gas is supplied to the first catalyst stage. The roasting gases react in the first catalyst stage 3 and are cooled in the heat exchanger 2 to the starting temperature before they enter a second catalyst stage 4, which they leave with a conversion of about 80–95%. The hot catalyst gases of the second stage are cooled in a heat exchanger 5 and then enter an intermediate absorber 6. According to the invention, the height of the trickling layer in this absorber is only about 20–30% of that of the final absorber. The roasting gases leaving the intermediate absorber 6 are freed from entrained acid by means of an asbestos filter 7 or any other suitable drop separator. They are then preheated again to the starting temperature in the heat exchanger 5 and reacted once again in a catalyst stage 8 and, after passing through the heat exchanger 1, they are almost completely absorbed in the final absorber.

The total conversions are 99.5% and higher. It is advantageous to carry out the intermediate absorption as a hot absorption. Whereas the residual gases which must be heated again for further catalysis are cooled to 60–70° C. by absorption in the trickling towers with cold 98% sulphuric acid, they are not or are only slightly cooled with the hot absorption. This has the essential advantage that the heat exchange surfaces for reheating the gas issuing from the intermediate absorption can be kept correspondingly smaller.

As it is necessary in every $SO_3$ absorption process, the heat evolved in the hot absorption must be continuously removed from the absorbent acid by cooling in a cyclic process. Since however in the hot absorption process any metallic material is not corrosion resistant at temperatures of 200° C. and more, it is necessary to use ceramic materials. Because of the danger of breaking and the poor heat conductivity an equipment using ceramic materials is costly, complicated, of large dimensions and rather unreliable in operation.

According to the invention the aforesaid difficulties can be avoided by providing a specific embodiment of the hot absorption process wherein is arranged before the sulphuric acid absorber an oleum absorber which absorbs the $SO_3$ so far that the amount of heat evolved in the subsequent sulphuric acid intermediate absorption is reduced to such an extent that the sulphuric acid cyclic process need not be cooled.

It is of advantage to subdivide the hot absorption as described above whenever it is desired to produce oleum. Together with the more concentrated gases of the two-stage catalysis, this method allows of producing an oleum of higher percentage than it has been possible with low percentage roasting gases according to the known contact process.

By splitting up the intermediate absorption in such a way that some of the $SO_3$ is absorbed in the first stage in the oleum absorber, advantageously down to about 4% $SO_3$ in the residual gas, it is possible to operate the subsequent sulphuric acid tower without cooling as a hot absorber (up to about 200° C.). If more $SO_3$ is absorbed by correspondingly stronger cooling in the preceding oleum absorber, the temperature of the circulating sulphuric acid in the hot absorber can be lowered accordingly. It is thus readily possible by more or less intensive cooling of the oleum in the circulation in the first stage to adjust the temperature of the circulating hot sulphuric acid in the second stage in the manner desired. The higher the temperature of the circulating sulphuric acid is kept, the smaller is the necessary exchange surface of heat exchanger 5a. For example, with a temperature in the hot absorber of 200° C., the catalytic gases in the exchanger 5a only have to be heated from about 200° C. to the starting temperature in the subsequent catalyst section of for example 400–420° C. This means that the exchange surface need only be about 60% of that which will be necessary if the gases only discharged at 60° C. from a normally operated absorber. The introduction of the hot absorption thus causes a further reduction in the necessary heat exchange surfaces.

Figure 2:
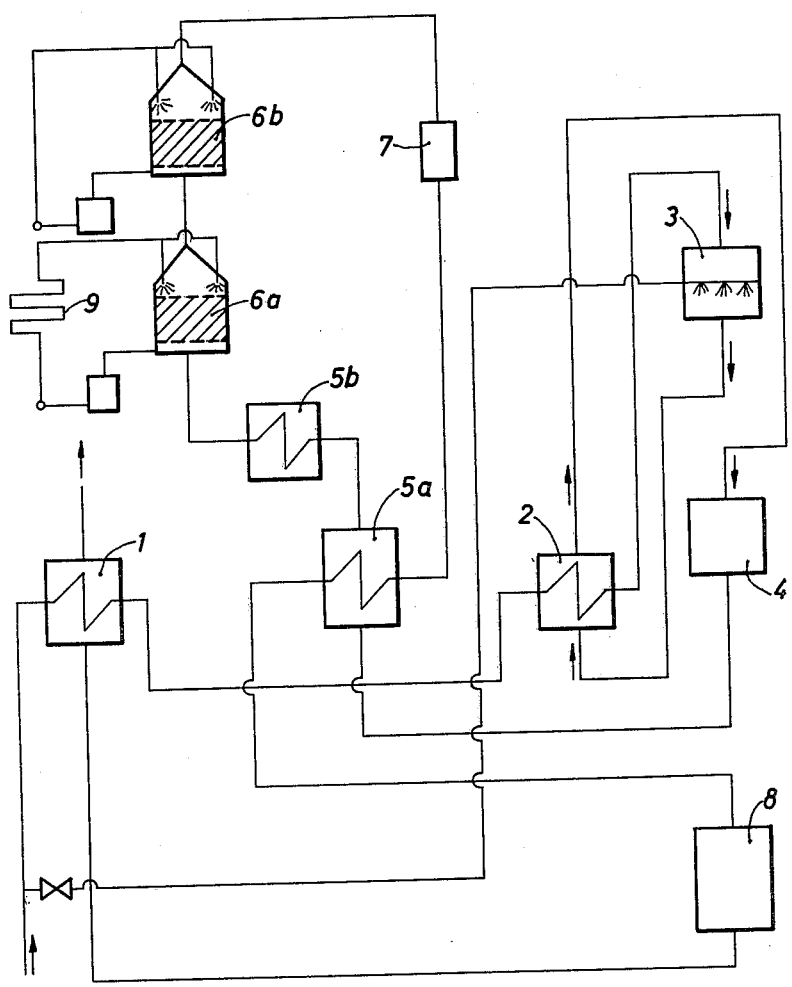

The manner of operation according to the invention is shown diagrammatically in the accompanying drawing, FIG. 2. In the drawing, 1 and 2 represent heat exchangers, while the first catalyst stage is indicated at 3 and the second catalyst stage at 4. 5a and 5b are heat exchangers, 6a and 6b are the two subdivided stages of the intermediate absorber, 7 is a filter, 8 is the third catalyst stage and 9 the oleum condenser.

The vanadium composition can, in known manner, be used in the form of cylindrical rods, as irregularly shaped granules or in other forms. It is also known to use the vanadium composition in the form of Raschig rings, with a diameter of for example 20/12 mm., in order to reduce the flow resistance. It has now been found that with catalysis without intermediate absorption, the starting temperature of the composition formed into rings is higher than when using the same composition in the form of small cylinders with a diameter of 4 or 6 mm. The higher starting temperature is noticeable in disadvantageous manner in the last catalyst stage, where it is of essential importance to work with lowest possible starting temperatures in order to achieve a largest possible conversion. It has now surprisingly been found that the starting temperature after the intermediate absorption in the final stage, when using vanadium catalyst composition in the form of Raschig rings, is the same as when using small cylinders with a diameter of 4 mm. so that, according to the present process, catalyst compositions in the form of Raschig rings can be used with particular advantage on account of the lower flow resistance as described above.

The accompanying diagrammatic drawing, FIGURE 1, only shows one of many possible forms. To achieve a highest possible conversion with concentrated $SO_2$ gases in accordance with the invention it is essential that the interposition of the intermediate absorption is at the point where the maximum possible quantity of $SO_2$ is converted to $SO_3$, i.e., before the last catalyst stage.

It is obvious also that gases containing $SO_2$ and of different origin, such as for example those obtained with the combustion of sulphur or in other ways, can be processed with advantage in suitable concentration by this process.

Example 1a

A hurdle-type catalyst furnace of conventional design with three vanadium catalyst stages, which produced a conversion of 97.5% when charged with approximately 7% roasting gas and with a loading of 22 tons of $SO_3$ per day, produced a conversion of only 94.5% with the same loading but with an iron pyrite roasting gas with 10% of $SO_2$ and 8% of $O_2$.

Example 1b

An identical catalyst furnace, except that before the last stage, the $SO_3$ so far formed was absorbed by sulphuric acid, produced a conversion of 99.6% with the same loading with pyrite roasting gases (10% $SO_2$, 8% $O_2$) without dilution with air. In this case, the input temperature of the first catalyst stage was 451° C., the reaction temperature prior to admixture of the cold roasting gas was 590° C. and, after the mixing, 552° C.; the gas left the first catalyst stage 3 at 580° C. and a conversion of 73.2%. The gas cooled by a heat exchanger to 450° C. entered the second stage. The discharging gas had a temperature of 497° C. and a conversion of 90.6%. After cooling to 175° C. using a heat exchanger, the gas entered the intermediate absorber, in which it was further cooled to 50° C. The residue of gas freed from the $SO_3$ was preheated by way of the same heat exchanger to 428° C. In the last catalyst stage, the temperature rose to 450° C.; the total conversion was 99.6%.

Example 2

The same catalytic furnace with intermediate absorption produced a conversion of 98.7% with a loading of 30 tons of $SO_3$ per day, when using a gas containing 12.2% of $SO_2$ and 9% of $O_2$. The input temperature into the first catalyst stage was 440° C.; it was 610° C. before admixing the cold gas and 510° C. thereafter. The gas left the first catalyst stage at 571° C. and with a conversion of 80%, was cooled by means of a heat exchanger to 448° C. and introduced into the second catalyst stage. In the latter, the temperature rose to 507° C. and the conversion to 92.7%. Thereafter, cooling was carried out to 217° C. by means of a heat exchanger and in the intermediate absorber to 64° C.; the residual gas was heated again in the same heat exchanger to 412° C. and introduced into the third catalyst stage, in which the temperature rose to 439° C. and the total conversion to 99.7%.

Example 3

The catalyst gases, after a 90% conversion, leave the central catalyst stage at a temperature of about 513° C. and enter the heat exchanger 5a, in order to heat the catalyst gases free from $SO_3$ and arriving at about 200° C. from the hot absorber 6b to the starting temperature of 420° C., which gases are then reacted in a subsequent catalyst stage 8 to more than 95%. In the exchanger 5a, the gases leaving the middle catalyst stage are cooled from about 513° to 323° C. These gases then enter an oleum tower 6a, where they give off some of their $SO_3$ to the 37% oleum, which is supplied to the tower at about 40° C. The cooling of the oleum is effected by way of wrought iron condensers or trickle condensers 9. With the temperature and concentration of the oleum as indicated, the gases enter at about 40° C. and with an $SO_3$ content of about 4% into a subsequent sulphric acid absorber 6b. By choosing the oleum supply temperature, it is readily possible so to select the $SO_3$ content of the discharging gases that the temperature, which is adjusted by the heat of absorption in the subsequent sulphuric acid absorber, does not exceed the permissible limit, in our example 200° C., even without cooling. Consequently, by providing an oleum tower in front, it is possible to operate a circulation in the subsequent hot absorber without using condensers, which are very susceptible at the high temperatures.

The hot absorption offers the further advantage that the gases leaving the heat exchanger 5a only have to be cooled to 323° C., so that a sufficiently high temperature level is available for a possible evaporation of $SO_3$ in an evaporator (5b) to produce pure $SO_3$.

Utilization of a lower initiation temperature in a later stage than in an earlier stage, as is done in Example 1b (451° C. and 428° C.) and Example 2 (440° C. and 412° C.) is the subject of application Serial No. 304,507, filed August 26, 1963 as a continuation-in-part of Serial No. 89,137, filed February 14, 1961, claiming priority of a German application filed February 20, 1960, and assigned to the assignee hereof.

We claim:

1. In a process for the production of sulphur trioxide from an $SO_2$-containing gas by catalytic oxidation in successive oxidation stages with intermediate absorption between two of said successive oxidation stages, the improvement which comprises passing gas from the first of said two oxidation stages in indirect heat exchange relation with the gas from the absorption to heat the gas from the absorption for introduction into the second of said two oxidation stages and to cool the gas from the first of said two oxidation stages for absorption, conducting the absorption in two absorption stages, the gas being contacted with oleum in the first absorption stage and with sulphuric acid in the second absorption stage, and the temperature of the gas from the second absorption stage being substantially in excess of 70° C., the gas from the second absorption stage being passed in said indirect heat exchange relation.

2. Process according to claim 1, wherein said gas is a roasting gas in purified condition and initially at less than about 70° C. and wherein said gas is heated prior to contact with catalyst in an oxidation stage by indirect heat exchange with gas from at least one of the oxidation stages.

3. Process according to claim 2, wherein heating of gas for introduction into the oxidation stages is entirely by heat exchange with gas from the oxidation stages, whereby use of an external supply of heat is avoided.

4. Process according to claim 3, wherein following the indirect heat exchange of gas from the first of said oxidation stages and gas from the absorption, the gas from the first of said oxidation stages is contacted with oleum in the first absorption stage, the oleum is circulated through said absorption stage and cooled externally thereof, the gas from the oleum absorption is passed to the second absorption stage and therein contacted with sulfuric acid, the $SO_3$ content of the gas entering the second absorption stage being less than about 4%.

5. Process according to claim 1, wherein following the indirect heat exchange of gas from the first of said oxidation stages and gas from the absorption, the gas from the first of said oxidation stages is contacted with oleum in the first absorption stage, the oleum is circulated through said absorption stage and cooled externally thereof, the gas from the oleum absorption is passed to the second absorption stage and therein contacted with sulphuric acid, the $SO_3$ content of the gas entering the second absorption stage being less than about 4%.

6. Process according to claim 1, wherein an intial oxidation stage precedes said two oxidation stages, said $SO_2$ containing gas being introduced into said initial oxidation stage and the gas from the initial oxidation stage being cooled for introduction into the first of said two oxidation stages by heat exchange with said $SO_2$ containing gas introduced into the initial oxidation stage.

7. Process according to claim 4, wherein an initial oxidation stage precedes said two oxidation stages, said $SO_2$ containing gas being introduced into said initial oxidation stage and the gas from the initial oxidation stage being cooled for introduction into the first of said two oxidation stages by heat exchange with said $SO_2$ containing gas introduced into the initial oxidation stage.

8. Process according to claim 1, wherein the sulphur-containing gas has a sulphur dioxide content of about 9–12%.

9. Process according to claim 6, wherein the sulphur-containing gas has a sulphur dioxide content of about 9–12%.

References Cited in the file of this patent
UNITED STATES PATENTS

| | | |
|---|---|---|
| 1,809,114 | Gillett | June 9, 1931 |
| 2,364,213 | Herrmann | Dec. 5, 1944 |
| 2,471,072 | Merriam | May 24, 1949 |